US010491271B2

(12) United States Patent
Pifferi

(10) Patent No.: US 10,491,271 B2
(45) Date of Patent: Nov. 26, 2019

(54) COEXISTENCE OF WIRELESS CHARGING AND NEAR FIELD COMMUNICATION IN A PORTABLE DATA TERMINAL

(71) Applicant: DATALOGIC IP TECH S.R.L., Bologna (IT)

(72) Inventor: Marco Pifferi, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 16/065,640

(22) PCT Filed: Dec. 23, 2015

(86) PCT No.: PCT/IT2015/000318
§ 371 (c)(1),
(2) Date: Jun. 22, 2018

(87) PCT Pub. No.: WO2017/109799
PCT Pub. Date: Jun. 29, 2017

(65) Prior Publication Data
US 2019/0028149 A1    Jan. 24, 2019

(51) Int. Cl.
*H04B 5/00* (2006.01)
*H02J 7/00* (2006.01)
(Continued)

(52) U.S. Cl.
CPC .......... *H04B 5/0081* (2013.01); *H02J 7/0027* (2013.01); *H02J 7/0044* (2013.01);
(Continued)

(58) Field of Classification Search
CPC ......... H02J 50/40; H04B 5/0081; H04W 4/80
(Continued)

(56) References Cited

U.S. PATENT DOCUMENTS

2010/0213895 A1*   8/2010   Keating ................. H02J 7/025
                                                        320/108
2013/0005251 A1    1/2013   Soar
(Continued)

FOREIGN PATENT DOCUMENTS

| EP | 2 680 393 A1 | 1/2014 |
| GB | 2516305 A | 1/2015 |
| WO | 2009/050625 A2 | 4/2009 |

OTHER PUBLICATIONS

International Search Report and Written Opinion, dated Aug. 26, 2016, for International Application No. PCT/IT2015/000318, 14 pages.

*Primary Examiner* — Kiet M Doan
(74) *Attorney, Agent, or Firm* — Cozen O'Connor

(57) ABSTRACT

Systems and methods which allow for the coexistence of wireless charging (WCH) and short-range communication (e.g., NFC) in a close spaced relationship. A cradle may include a plurality of slots which each removably receive one of the mobile systems. The cradle and the mobile systems may each include NFC and WCH coils that are closely spaced but are placed orthogonally relative to each other. A time multiplexer may be used to disconnect WCH while performing NFC communication to prevent crosstalk in the same mobile system. A filtering system may act on the NFC circuits to allow contemporary activation of WCH and NFC communication on mobile systems. A slot multiplexer may be provided in the cradle to allow for selection of a single mobile system slot at a time to activate NFC communication with the mobile systems, using a single NFC communication controller for all of the mobile system slots.

22 Claims, 7 Drawing Sheets

(51) Int. Cl.
  *H02J 13/00*  (2006.01)
  *H02J 50/10*  (2016.01)
  *H02J 50/20*  (2016.01)
  *H02J 50/40*  (2016.01)
  *H02J 7/02*   (2016.01)

(52) U.S. Cl.
  CPC .......... *H02J 7/025* (2013.01); *H02J 13/0075* (2013.01); *H02J 50/10* (2016.02); *H02J 50/20* (2016.02); *H02J 50/40* (2016.02); *H04B 5/0031* (2013.01); *H04B 5/0037* (2013.01); *H02J 2007/0096* (2013.01); *Y02B 70/3216* (2013.01); *Y04S 20/221* (2013.01)

(58) Field of Classification Search
  USPC .......... 455/41.1, 573; 343/702; 307/104; 320/720, 108, 103; 250/455.11; 340/539.21
  See application file for complete search history.

(56) References Cited

U.S. PATENT DOCUMENTS

| | | |
|---|---|---|
| 2014/0091758 A1 | 4/2014 | Hidaka et al. |
| 2014/0139178 A1* | 5/2014 | Large .................. H02J 7/0044 320/108 |
| 2014/0241555 A1 | 8/2014 | Terlizzi |
| 2014/0349572 A1* | 11/2014 | Ben-Shalom ........ H04B 5/0031 455/41.1 |
| 2014/0361740 A1 | 12/2014 | Suzuki et al. |
| 2014/0375262 A1 | 12/2014 | Yamaguchi et al. |
| 2015/0093989 A1* | 4/2015 | Plumb .................. H02J 5/005 455/41.1 |
| 2015/0115173 A1* | 4/2015 | Kim ........................ A61L 2/10 250/455.11 |
| 2015/0115880 A1 | 4/2015 | Soar |
| 2015/0145742 A1 | 5/2015 | Cao |
| 2016/0308384 A1* | 10/2016 | Zhang .................... H02J 7/025 |

* cited by examiner

COEXISTENCE OF WIRELESS CHARGING AND NEAR FIELD COMMUNICATION IN A PORTABLE DATA TERMINAL

BACKGROUND

Technical Field

The present disclosure generally relates to wireless power and data transfer between processor-based systems.

Description of the Related Art

Wireless power allows a powered system or device to be provided with power without the use of wires. A wireless power transmitter system transfers energy wirelessly to a wireless power receiver system. Inductive coupling may be used to transfer electromagnetic energy between the wireless power transmitter system and the wireless power receiver system. The energy that is transmitted to the wireless power receiver system may be used by the wireless power receiver system to charge a chargeable power source (e.g., rechargeable battery) of the wireless power receiver system, and to provide power to components of the wireless power receiver system to allow the components to operate.

Near field communication (NFC) is a set of short-range wireless communications technologies, typically requiring a distance of 10 centimeters (cm) or less and operating at 13.56 MHz. Generally, NFC involves an initiator and a target. NFC peer-to-peer communication may be used provided both devices are powered. The initiator may also actively generate an RF field which may power a passive target. This feature enables NFC targets to take very simple form factors such as tags, stickers, key fobs, or cards which do not require batteries.

NFC tags store data and may be read-only or may be rewriteable. The NFC tags can securely store data such as payment card information, loyalty program data, PINs, device identifiers, and other information. NFC tags can also store data or instructions which may be used to permit a device to issue commands, requests, notifications, etc., to another device.

NFC uses magnetic induction between two antennas or coils located within each other's near field, effectively forming an air-core transformer. As noted above, NFC systems may utilize one of two modes, passive communication mode and active communication mode. In passive communication mode, the initiator device provides an RF carrier field and the target device answers by modulating the existing field. In this mode, the target device may draw its operating power from the initiator-provided electromagnetic field. In the active communication mode, both the initiator device and the target device communicate by alternately generating their own fields. A device deactivates its RF field while the device is waiting for data from another device. In this mode, both devices may initiate an NFC session since each device has a power supply, but such increases the costs, the size and the complexity of the devices.

Even if a wireless charging system and an NFC system are both tuned magnetic systems, such systems tend to induce disturbances to each other when in operation in close proximity to each other. Such disturbances are largely from the wireless charging system to the NFC system due to the relatively strong magnetic field utilized to transfer power wirelessly. Such disturbances become more troublesome for compact applications, such as smart phones or self-shopping systems, where the components of the wireless charging system and NFC system are positioned close to each other.

BRIEF SUMMARY

A wireless charging system may be summarized as including a plurality of mobile system slots each sized and dimensioned to removably receive at least a portion of one of a plurality of mobile processor-based systems therein; a plurality of short-range wireless communications antenna coils, each of the short-range wireless communications antenna coils associated with one of the plurality of mobile system slots; a plurality of wireless charging antenna coils, each of the wireless charging antenna coils associated with one of the plurality of mobile system slots, and each of the wireless charging antenna coils disposed orthogonally to the plurality short-range wireless communications antenna coils; at least one nontransitory processor-readable storage medium which stores at least one of processor-executable instructions or data; and at least one charging cradle processor communicably coupled to the at least one nontransitory processor-readable storage medium, the plurality of short-range wireless communications antenna coils, and the plurality of wireless charging antenna coils, in operation the at least one charging cradle processor: selectively communicates with at least one of the plurality of mobile processor-based systems via the plurality of short-range wireless communications antenna coils; and selectively supplies power wirelessly to at least one of the plurality of mobile processor-based systems via at least one of the plurality of wireless charging antenna coils.

The wireless charging system may further include a filtering system operatively coupled between the plurality of short-range wireless communications antenna coil and the at least one charging cradle processor, in operation the filtering system attenuates signals with frequencies at which power is supplied wirelessly via the plurality of wireless charging antenna coils. The filtering system may include a high-pass filter which passes signals with frequencies higher than a cutoff frequency and attenuates signals with frequencies lower than the cutoff frequency. The at least one charging cradle processor may communicate with a first mobile processor-based system disposed in a first mobile system slot of the plurality of mobile system slots via the short-range wireless communications antenna coil of the first mobile system slot; and, concurrent with the communication with the first mobile processor-based system, supply power wirelessly to the first mobile processor-based system via the wireless charging antenna coil of the first mobile system slot.

For each mobile processor-based system disposed in one of the mobile system slots, the at least one charging cradle processor may disable the supply of wireless power to the mobile processor-based system via the wireless charging antenna coil of the mobile system slot; and communicate with the mobile processor-based system via the short-range wireless communications antenna coil of the mobile system slot concurrent with the supply of wireless power to the mobile processor-based system being disabled. For each mobile processor-based system disposed in one of the mobile system slots, the at least one charging cradle processor may supply power wirelessly to the mobile processor-based system via the wireless charging antenna coil of the mobile system slot; identify an initiation of a communication with the mobile processor-based system via the short-range wireless communications antenna coil of the mobile system slot; responsive to the identification of the initiation of the communication, cease the supply of power to the mobile processor-based system; and, subsequent to the cease of the supply of power to the mobile processor-based system, communicate with the mobile processor-based system via the short-range wireless communications antenna coil of the mobile system slot. For each mobile processor-based system disposed in one of the mobile system slots, the at least one charging cradle processor may detect an end of the communication with the mobile processor-based system via the short range wireless communications antenna coil of the mobile system slot; and, responsive to the detection of the end of the communication, resume the wireless supply of power to the mobile processor-based system via the wireless charging antenna coil of the mobile system slot.

The at least one charging cradle processor may communicate with a first one of the mobile processor-based systems via the short-range wireless communications antenna coil of a first mobile system slot of the mobile system slots when the first one of the mobile processor-based systems is disposed in the first mobile system slot; and concurrently supply power wirelessly to a second one of the mobile processor-based systems positioned in a second mobile system slot of the mobile system slots via the wireless charging antenna coil of the second mobile system slot.

The at least one charging cradle processor may include a single short-range wireless communications reader, and the wireless charging system may further include a multiplexer coupled between the short-range wireless communications reader and the plurality of short-range wireless communications coils, the multiplexer selectively couples one of the short-range wireless communications antenna coils to the short-range wireless communications reader to facilitate communication between the short-range wireless communications reader and a mobile processor-based system disposed in any of the plurality of mobile system slots via the short-range wireless communications antenna coils. Each of the plurality of short-range wireless communications antenna coils may include traces on a printed circuit board.

The at least one charging cradle processor may communicate with a first mobile processor-based system disposed in a first mobile system slot of the plurality of mobile system slots via the short-range wireless communications antenna coil associated with the first mobile system slot; and, concurrent with the communication with the first mobile processor-based system, supply power wirelessly to a second mobile processor-based system disposed in a second mobile system slot of the plurality of mobile system slots via the wireless charging antenna coil of the second mobile system slot. The plurality of mobile system slots may be aligned in a row, and the second mobile system slot may be adjacent the first mobile system slot in the row of mobile system slots.

A mobile processor-based system may be summarized as including a chargeable power source; a short-range wireless communications receiver comprising a short-range wireless communications antenna coil; a wireless power receiver operatively coupled to the chargeable power source which receives power wirelessly from a wireless power transmitter of a wireless charging cradle via a wireless charging antenna coil, the wireless charging antenna coil disposed orthogonally to the short-range communications antenna coil; at least one nontransitory processor-readable storage medium that stores at least one of processor-executable instructions or data; and at least one system processor communicably coupled to the at least one nontransitory processor-readable storage medium, the short-range wireless communications receiver, and the wireless power receiver, the at least one system processor: receives, via the wireless charging antenna coil, power wirelessly from the wireless power transmitter of the wireless charging cradle; and communicates, via the short-range wireless communications antenna coil, at least one of instructions or data with the wireless charging cradle.

The mobile processor-based system may further include a machine-readable symbol reader system comprising an optical window, wherein the short-range wireless communications antenna coil is disposed adjacent the optical window of the machine-readable symbol reader system.

The mobile processor-based system may further include a machine-readable symbol reader system comprising an optical exit, wherein the short-range wireless communications antenna coil is disposed between the optical exit and an exterior of the mobile processor-based system.

The at least one system processor may send, via the wireless power receiver, a short-range wireless communications channel request signal to the wireless power transmitter of the wireless charging cradle via the wireless charging antenna coil; receive, via the short-range wireless communications receiver, an initiation signal sent from a short-range wireless communications transceiver of the wireless charging cradle responsive to receipt of the short-range wireless communications channel request signal, the initiation signal initiates a short-range wireless communications channel; and communicate, via the short-range wireless communications receiver, at least one of instructions or data with the wireless charging cradle. The short-range wireless communications channel request signal may include an end-of-charge message. The short-range wireless communications receiver may include a near field communication (NFC) receiver. The short-range wireless communications receiver may include a passive NFC tag. The mobile processor-based system may include at least one of a self-shopping system, smartphone, tablet computer, wearable device, headset, speaker, mouse, keyboard, laptop, notebook, or media player.

The mobile processor-based system may further include a filtering system operatively coupled between the short-range wireless communications antenna coil and the short-range wireless communications receiver, in operation the filtering system attenuates signals with frequencies at which power is supplied wirelessly via the wireless power transmitter of the wireless charging cradle. The filtering system may include a high-pass filter which passes signals with frequencies higher than a cutoff frequency and attenuates signals with frequencies lower than the cutoff frequency.

A method of operating a wireless charging cradle, the wireless charging cradle including a plurality of mobile system slots each sized and dimensioned to removably receive at least a portion of one of a plurality of mobile processor-based systems therein, a plurality of short-range wireless communications antenna coils, each of the short-range wireless communications antenna coils associated with one of the plurality of mobile system slots, a plurality of wireless charging antenna coils, each of the wireless charging antenna coils associated with one of the plurality of mobile system slots, and each of the wireless charging antenna coils disposed orthogonally to the plurality of short-range wireless communications antenna coils, at least one nontransitory processor-readable storage medium which stores at least one of processor-executable instructions or data, and at least one charging cradle processor communicably coupled to the at least one nontransitory processor-readable storage medium, the plurality of short-range wireless communications antenna coils, and the plurality of wireless charging antenna coils, and the method may be summarized as including supplying power wirelessly to at least a first mobile processor-based system disposed in a first mobile system slot of the plurality of mobile system slots via the wireless charging antenna coil of the first mobile system slot; identifying an initiation of a communication with the first mobile processor-based system via the short-range wireless communications antenna coil of the first mobile system slot; responsive to identifying the initiation of the communication, ceasing the supply of power to the first mobile processor-based system; and subsequent to the ceasing of the supply of power to the first mobile processor-based system, communicating with the first mobile processor-based system via the short-range wireless communications antenna coil of the first mobile system slot.

The method may further include identifying a termination of the communication between the wireless charging cradle and the first mobile processor-based system; and responsive to identifying the termination of the communication, supplying power wirelessly to the first mobile processor-based system via the wireless charging antenna coil of the first mobile system slot.

The method may further include concurrent with communicating with the first mobile processor-based system, supplying power wirelessly to a second mobile processor-based system disposed in a second mobile system slot of the plurality of mobile system slots via the wireless charging antenna coil of the second mobile system slot.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
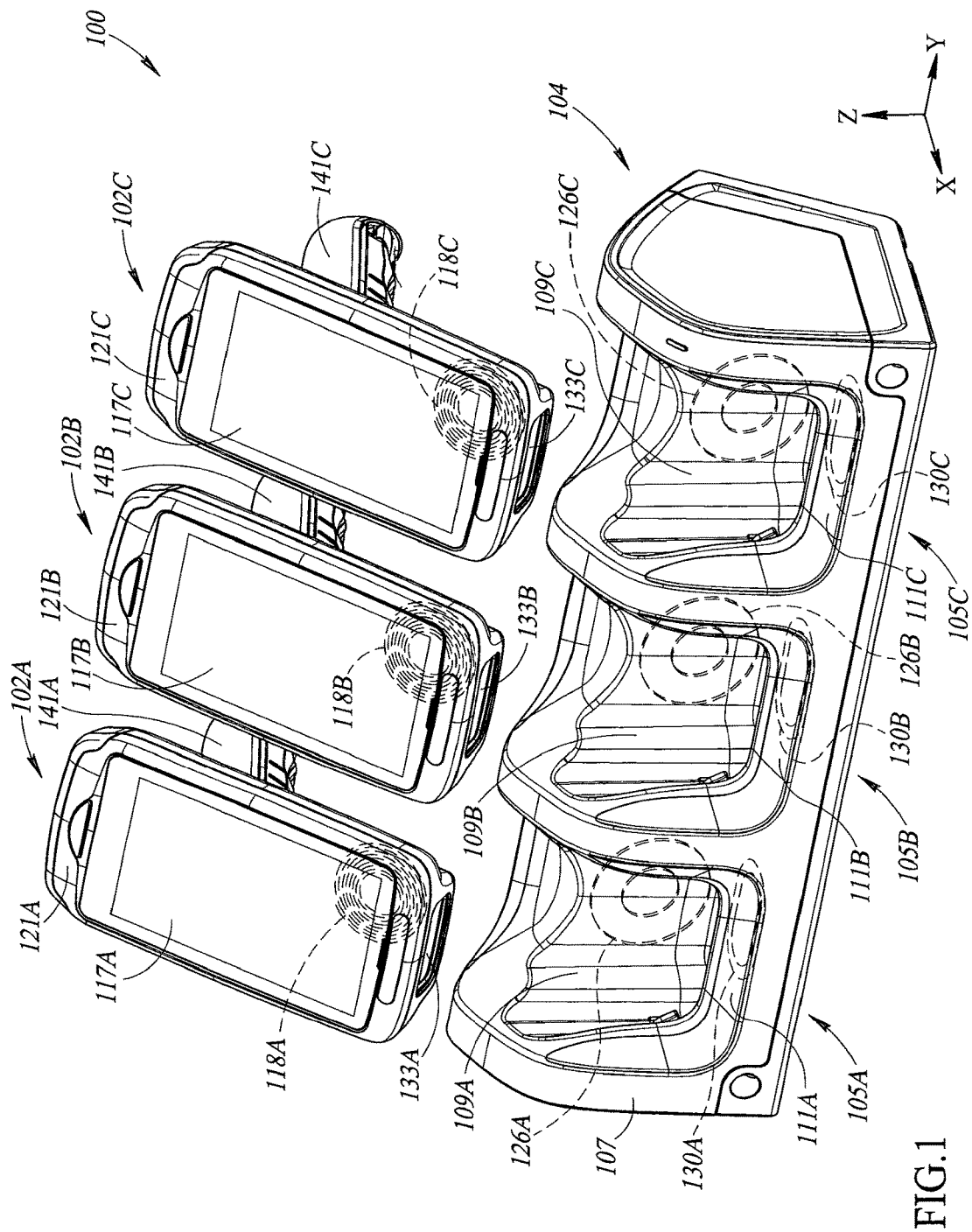
FIG. 1 shows three mobile self-shopping systems or terminals and a wireless charging cradle or base station which may be used to wirelessly charge and communicate with the self-shopping systems, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods which facilitate the coexistence of wireless charging (WCH) and short-range communication (e.g., NFC) in a close spaced relationship, such as mobile shopping system or other mobile processor-based system. Such mobile systems consume near field inductive power which is used to charge chargeable power sources (e.g., rechargeable batteries), and may include various types of mobile systems or devices, such as mobile self-shopping systems, smartphones, tablet computers, wearable devices (e.g., watch, bracelet), headsets, speakers, mice, keyboards, laptop computers, notebook computers, media players, medical devices, or any other mobile device or system which includes a chargeable power source. In some implementations discussed herein, a plurality of mobile systems may be stored in a dispensing rack or cradle which includes a plurality of adjacent slots that each removably receive one of the mobile systems.

As noted above, WCH may generate a relatively strong electromagnetic field which can impair nearby NFC communications. To eliminate or reduce this undesirable behavior, implementations of the present disclosure provide NFC and WCH coils that are closely spaced with each other but are placed orthogonally relative to each other, which minimizes crosstalk between one or more NFC systems and one or more WCH systems. In some implementations, a WCH end-of-charge (EOC) signal may be used to initiate NFC pairing between a mobile system and a wireless charging cradle, and a time multiplexer may be used to disconnect WCH while performing NFC communication to prevent crosstalk in the same mobile system. That is, alternate temporal slots may be used for operations, which facilitates the selection and use of one of a wireless charge coil and an NFC coil at a time to eliminate mutual interference between them.

In some implementations, a filtering system acts on the NFC circuit and is coupled to the orthogonal arrangement of the coils to allow contemporary activation of WCH and NFC communication on mobile processor-based systems with further minimized mutual interference. For example, NFC may be operative on a first mobile processor-based system while WCH is active for a second mobile processor-based system in an adjacent mobile system slot of the wireless charging cradle. The filtering system for the NFC circuit of the first mobile processor-based system may reduce the effect of interference caused by the WCH of the nearby second mobile processor-based system. In some implementations, the filtering system may also be used to reduce WCH/NFC crosstalk in the same mobile system during concurrent activation of WCH and NFC on the same mobile system. The filtering system may attenuate signals at frequencies (e.g., 130 kHz) used for WCH while passing signals at frequencies (e.g., 13.56 MHz) used for NFC communication.

In some implementations, a slot multiplexing system is provided in the wireless charging cradle to allow for selection of a single mobile system slot at a time from the total number of implemented slots to activate NFC communication with the mobile systems, using a single NFC communication controller for all of the mobile system slots. In other implementations, each of the mobile system slots is equipped with a separate NFC controller. Such feature may reduce the total cost of the wireless charging cradle while increasing system performance.

In some implementations, one or more wireless signals sent by a mobile system over a wireless charging channel are used to initiate communication between an NFC reader presented in a wireless charging cradle or base station and a passive NFC tag (or an active NFC tag used in a passive mode) present in the mobile system. Such feature allows the mobile system to act as an initiator for NFC communication without requiring the mobile system to be equipped with a relatively expensive NFC reader. There are numerous instances where it may be desirable for the mobile system to act as an initiator of an NFC session. For example, in some applications a mobile system may communicate an authorization for an action before the cradle is able to send information via NFC to the mobile system.

A mobile system may communicate with a cradle over a wireless charging channel to request initiation of an NFC session. For example, a wireless power receiver of a mobile system may communicate with a wireless power transmitter of a cradle using backscatter modulation. In such instances, the wireless power receiver of the mobile system may modulate the amount of power which the wireless power receiver draws from a power signal sent by the wireless power transmitter of the cradle. The wireless power transmitter of the cradle may detect such modulation to decode information contained therein.

In some implementations, a wireless charging communications protocol defined by the Wireless Power Consortium (WPC) (see WPC v1.1, July 2015) is used to send data from a mobile system to a cradle over a wireless charge channel. Such protocol provides a minimal data exchange protocol to send data from a mobile system to a cradle to indicate the amount of current (power) needed for charging. More specifically, the WPC protocol allows the wireless charge channel between the mobile system and the cradle to be used to permit the mobile system to write data to memory (e.g., registers) of the cradle using the aforementioned backscatter modulation scheme.

In some implementations, the WPC protocol is utilized to communicate data from the mobile systems to the cradle to initiate NFC pairing. For example, the mobile system may send an "end-of-charge" or "charge complete" end of power transfer (EPT) code, EPT0x01, to the cradle, and the cradle is programmed to interpret such code as a request for NFC pairing between the mobile system and the cradle. That is, the end-of-charge code is "repurposed" to signal a request for NFC pairing. Such process has the advantage of avoiding the requirement to install an active NFC reader in the mobile system which would cause a more complex and costly architecture. Such process may also be implemented in mobile systems which include an active NFC reader and are in an application in which it is desirable for the mobile systems to initiate NFC pairing.

FIG. 1 shows an example wireless charging system 100 which includes three electronic devices or systems in the form of mobile self-shopping systems 102A-102C (collectively or generally 102) and a charging system or base station in the form of a recharging cradle 104. Each of the mobile systems 102A-102C includes body portions 121A-121C, respectively, and handle portions 141A-141C. The body portions 121A-121C may each include respective touchscreens 117A-117C or other interfaces. The cradle 104 includes a cradle housing or body 107 which forms three slots 105A-105C that each removably receive one of the mobile self-shopping systems 102A-102C. Each of the slots 105A-105C includes respective base portions 111A-111C and back wall portions 109A-109C. As discussed further below, wireless charging coils 126A-126C are disposed adjacent to and behind the back wall portions 109A-109C, respectively. Similarly, short-range communications coils 130A-130C are disposed adjacent to and below the base portions 111A-111C, respectively. The short-range communications coils 130A-130C are disposed orthogonally to the wireless charging coils 126A-126C. For example, in FIG. 1 the short-range communications coils 130A-130C may lie substantially in an X-Y plane whereas the wireless charging coils 126A-126C may lie substantially in a Y-Z plane that is orthogonal to the X-Y plane.

Figure 2:
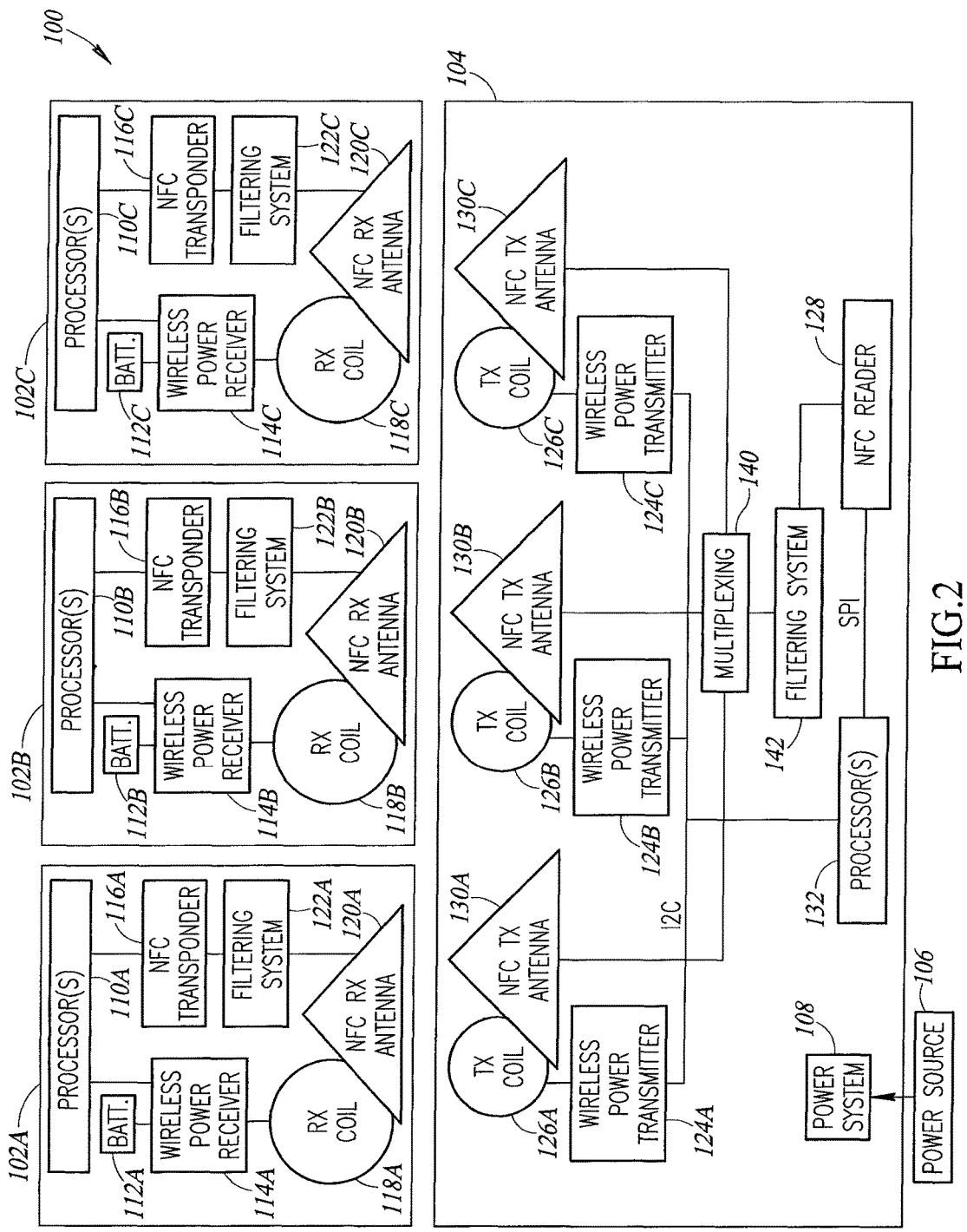
FIG. 2 shows a schematic block diagram of the three mobile self-shopping systems and the wireless charging cradle which receives and recharges the mobile processor-based systems, according to one illustrated implementation.

Referring to FIG. 2, a power source 106, such as mains power and/or an AC/DC converter, may be operatively coupled to a power subsystem 108 of the cradle 104, and an optional host computer system (not shown) may also communicatively coupled to the cradle via one or more data communications channels (e.g., USB, wireless, Internet).

The mobile self-shopping systems 102A-102C may be computing devices having respective processors 110A-110C which execute processor-executable instructions and respective nontransitory processor-readable storage media which stores data and processor-executable instructions. As shown in FIG. 2, the mobile self-shopping systems 102A-102C may also include respective chargeable power sources 112A-112C (e.g., rechargeable battery), wireless power receivers 114A-114C, and NFC transponders 116A-116C. The wireless power receivers 114A-114C may be coupled to respective wireless charging receiver coils 118A-118C. The NFC transponders 116A-116C may be coupled to respective NFC receiver coils 120A-120C via optional respective filtering systems 122A-122C. As discussed below, the filtering systems 122A-122C filter WCH signals to reduce or eliminate interference caused by the WCH signals. In some implementations, each of the wireless power receivers 114 may be a model BQ51025 wireless power receiver available from Texas Instruments, Inc.

The self-shopping systems or "self-scanning shopping systems" 102 may facilitate purchase at a self-service shopping site, namely where the customer collects the desired products from shelves and/or counters, including manned counters, and reads a product code from each product that the customer selects to purchase via a terminal, typically a portable terminal (hand-held mobile computer), to obtain product data typically including the price. The product data may be stored in a list. At the end of shopping, the cash slip and the payment may be made based on the stored list. There are many advantages of these shopping systems. In this way, the customer is able, amongst other things, to know in real-time the price of each product and/or the total price accumulated for the products selected for purchase and, at the end, has no need have to the codes rechecked at the cash desk before payment, avoiding queues at the checkouts. Moreover, the customer can take advantage of the customer's loyalty card through dedicated promotional offers. At the shopping site, the shopping history of each customer can also be stored, for example, for statistical purposes and/or to make targeted advertisements and promotions. It is also possible to monitor availability on the shelves in real-time, particularly of high-consumption products in the peak hours, and restock such items in real-time.

The wireless power receiver 114 of each of the mobile-self shopping systems 102 may be integrated within the self-shopping system or may be a separate component connected to the self-shopping system (e.g., through a charge port, USB). The wireless power receiver 114 include the induction coil 118 which receives power transmitted from one of the wireless charging coils 126A-126C of a respective wireless power transmitter 124A-126C of the cradle 104 when the self-shopping system is positioned in one of the mobile system slots 105A-105C of the cradle.

The NFC transponder 116 may be passive or active. The NFC transponder 116 may be capable of transmitting information stored therein to other NFC devices, such as an NFC reader 128 of the cradle 104. Such information may include, but is not limited to, device identifier, user identifier, financial information (e.g., payment card information), transaction information, charge status information for the chargeable power source 112, instructions, commands or requests executable by the cradle 104 or one or more computer systems communicatively coupled to the cradle, or any other information which may be used by the cradle 104 and/or one or more computer systems coupled to the cradle 104. The cradle 104 may be operatively coupled to a host computer system which may include any suitable type of local or remote computer systems, such as POS terminals, automobile electronics, public access charging systems, personal computers, etc. In some implementations, the NFC transponder 116 may be powered by an electromagnetic field created by the NFC reader 128. For example, upon being woken up by the NFC reader 128, the NFC transponder 116 may transmit the information stored therein to the NFC reader of the cradle 104.

The cradle 104 is operative to wirelessly charge the respective chargeable power source 112A-112C of the mobile self-shopping systems 102A-102C when the mobile systems are disposed in one of the mobile system slots 105A-105C. For example, the cradle 104 may be placed in a kiosk at a store or market where the self-shopping systems 102 may be provided to a customer for use while shopping. The cradle 104 includes the wireless power transmitters 124A-124C and the NFC reader 128. In some implementations, the NFC reader 128 may comprise a model TRF7970A NFC transceiver IC available from Texas Instruments, Inc. The NFC reader 128 may be coupled to the NFC transmitter coils 130A-130C via a multiplexer 140 which allows a single NFC reader (or controller) to be used to communicate with mobile systems in each of the three mobile system slots 105A-105C. The NFC reader 128 may receive and transmit information through the NFC protocol at short distances via NFC transmitter coils 130A-130C positioned at respective mobile system slots 105A-105C of the cradle 104. For example, the NFC reader 128 may receive information from the NFC transponders 116 of the mobile self-shopping systems 102A-102C when the self-shopping systems are placed in the mobile system slots 105A-105C, respectively, of the cradle 104 for recharging or storage. As noted above, the NFC transponders 116A-116C may be "woken up" by the NFC reader 128 by detecting the electromagnetic field generated by the respective coils 126A-126C of the NFC reader via the coils 118A-118C of the NFC transponders. The NFC reader 128 may generate an electromagnetic carrier field whereby the NFC transponders 116 may draw operating power to transmit information stored in the NFC transponder to the NFC reader via the NFC protocol.

In some implementations, a filtering system 142 may be positioned between the NFC coils 130A-130C and the NFC reader 128. The filtering system 142 may be operative to attenuate signals that have frequencies used by the wireless power transmitters 124A-124C so that the wireless charging of one or more of the mobile systems 102A-102C does not interfere with NFC communication. The filtering system 142 may be similar or identical to filtering systems 122A-122C of the mobile systems 102A-102C. For example, the filtering systems 122A-122C and 142 may comprise a high pass filter which attenuates the carrier signal used for wireless charging and passes signals used for NFC communication. In some implementations, the carrier signal used for wireless charging is approximately 130 kHz and the signals used for NFC communication have a frequency of 13.56 MHz. The filtering systems 122A-122C and 142 may include any number of active components (e.g., amplifiers) and/or passive components (e.g., resistors, capacitors, inductors).

In operation, upon being placed in one of the slots 105A-105C of the cradle 104, the mobile self-shopping system 102 may initiate a charging process by transmitting a digital packet to the cradle over a wireless charge channel between the wireless power receiver 114 of the mobile self-shopping system and the wireless power transmitter 124 of the cradle associated with the slot in which the mobile system is placed. The mobile self-shopping system 102 may also send one or more digital packets to the cradle 104 which instructs the wireless power transmitter 124 to tune to a proper energy level to transfer power to the self-shopping system. Further, the mobile self-shopping system 102 may send an NFC channel initiation request message to the cradle 104 which causes the cradle to initiate an NFC session, as discussed further below.

In some implementations, the NFC channel initiation request message may be coded in the form of an end-of-charge message (e.g., EPT0x01), which may normally be used to signal to the cradle 104 that the chargeable power source 112 is fully charged. In such instances, the cradle 104 interprets the repurposed end-of-charge message received from the self-shopping system 102 as a request for initiation of an NFC session, rather than a "charge complete" notification. Since EPT messages are well defined in the WPC v1.1 standard, this method may be used irrespective of silicon implementations and/or suppliers for the wireless power receiver 114 and wireless power transmitter 124 integrated circuits. WPC codes other than the end-of-charge EPT code may also be used.

Each of the mobile processor-based systems 102 may also include one or more memory components, input/output (I/O) components, and communication interfaces. In some implementations, the mobile system 102 may include additional components or may omit one or more of the aforementioned components. Further, in some implementations, one or more components may be combined or arranged differently than depicted in the example provided in FIG. 2.

The cradle 104 may include one or more processor(s) 132, one or more memory components, input/output components, and communication interfaces. In some implementations, the cradle 104 may include additional components or may omit one or more of the aforementioned components. Further, in some implementations, one or more components may be combined or arranged differently than depicted in the example provided in FIG. 2.

The power source 106 may be an alternating-current source connected to a power grid, a battery, or other source. The power source 106 may be external or internal to a housing 107 of the cradle 104. The power source 106 powers the power subsystem 108, which distributes power to various components and/or devices of the cradle 104. Although a power connection is only illustrated from the power source 106 to the power subsystem 108, suitable connections to other components may also exist, but are omitted from FIG. 2 to avoid obscuring other aspects of the cradle 104.

The processors 110 and 132 may comprise a general-purpose processor (e.g., central processing unit (CPU), or the like), a special purpose processor, a Field-Programmable Gate Array (FPGA), an Application Specific Integrated Circuit (ASIC), or the like. In some implementations, the processor 132 is an MSP430 mixed-signal microcontroller available from Texas Instruments, Inc. The processors 110 and 132 may include and/or may be communicatively coupled to memory storage, which may be incorporated as part of the processor and/or provided as a separate component. The memory may be implemented using one or more of any suitable data storage mechanism, including, but not limited to: random access memory (RAM), such as DRAM, or the like, non-volatile, solid-state storage, such as Flash memory, hard disk storage, optical storage media, or the like. In some embodiments, the memory may comprise a non-transitory storage medium having stored thereon machine-readable and/or executable instructions which cause the cradle 104 and/or mobile systems 102A-102C to perform various methods discussed herein.

The controller or processor 132 of the cradle 104 may be operatively connected to a host computer system (e.g., a POS computer system). The processor 132 may communicate with the host computer system to provide the host computer system with information obtained by the NFC reader 128 or information received from an I/O component (e.g., machine-readable symbol reader system).

The NFC reader 128 may wirelessly obtain information from the mobile systems 102. The information may include, but is not limited to customer loyalty information (e.g., loyalty card, customer identifier, etc.), membership information (e.g., membership card, member identifier, etc.), coupons, payment information (e.g., credit card, debit card, food stamp card, etc.), charge status, commands, requests, and so on.

As noted above, the mobile system 102 may include a chargeable power source 112, such as a battery, fuel cell, capacitor, or the like. The chargeable power source 112 may be wirelessly charged using the wireless power transmitters 124A-124C of the cradle 104 when the mobile system is disposed within a mobile system slot 105 of the cradle 104. In some implementations, each of the wireless power transmitters 124 may be a model BQ500214 wireless power transmitter available from Texas Instruments, Inc. The chargeable power source 112 powers the mobile system 102, and receives power wirelessly from the wireless power receiver 114.

In some implementations, I/O components of the mobile systems 102 may include one or more components which obtain data pertaining to a customer transaction (e.g., obtain data pertaining to a customer's items for purchase). For example, I/O components of the mobile system 102 may include a scan engine 115 (FIG. 3), such as an optical reader (e.g., machine-readable symbol reader or scanner), RFID reader, or the like. As shown in FIG. 1, the mobile systems 102A-102C each include respective front windows 133A-133B which provide optical access to the scan engines of each of the mobile systems. One or more I/O components may obtain data in a format for which the host computer system is programmed (e.g., a barcode format). The operation of the I/O components may be managed by the processor 110 of the mobile system 102, for example.

The wireless power transmitters 124A-124C of the cradle 104 may each include a power conversion unit and a communications and control unit. The power conversion unit of each of the transmitters 124A-124C may include the transmitting coils 126A-126C, respectively, which generate the electromagnetic field. The control and communications unit may regulate the transferred power to a level that requested by the wireless power receiver 114 of the mobile system 102.

The wireless power receiver 114 of the mobile system 102 may include a power pick-up unit as well as a communications and control unit. Similar to the power conversion unit of the wireless power transmitter 124, the power pick-up unit of the wireless power receiver 114 may capture the electromagnetic field from the cradle 104 via the receiving coil 118. The communications and control unit of the wireless power receiver 114 may regulate the transferred power to the level that is appropriate for the chargeable power source 112 (e.g., battery) connected to the output of the wireless power receiver, and may cause data to be sent to the wireless power transmitter 124 in-band over the wireless charge channel.

In operation, upon being placed proximate the cradle 104, the mobile system 102 may initiate a charging process by transmitting a digital packet to the cradle over a wireless charge channel between the wireless power receiver 114 of the mobile system and the wireless power transmitter 124 of the cradle.

The mobile system 102 may send an NFC channel initiation request message to the cradle 104 over the wireless charge channel using backscatter modulation, for example. In such instances, the wireless power receiver 114 of the mobile system 102 modulates the amount of power drawn from the wireless power transmitter 124 of the cradle 104 associated with the slot 105 in which the mobile system is placed, which modulation is detected by the wireless power transmitter 124. In other words, the wireless power receiver 114 and the wireless power transmitter 124 use an amplitude modulated power signal to provide an in-band communications channel over the wireless charge channel.

In some implementations, upon detecting that an NFC communication is to occur between the cradle 104 and a mobile system 102 placed in one of the slots 105, the cradle may temporarily cease wireless charging for the mobile system to eliminate interference to the NFC communication which would otherwise be caused by the wireless charging.

Figure 3:
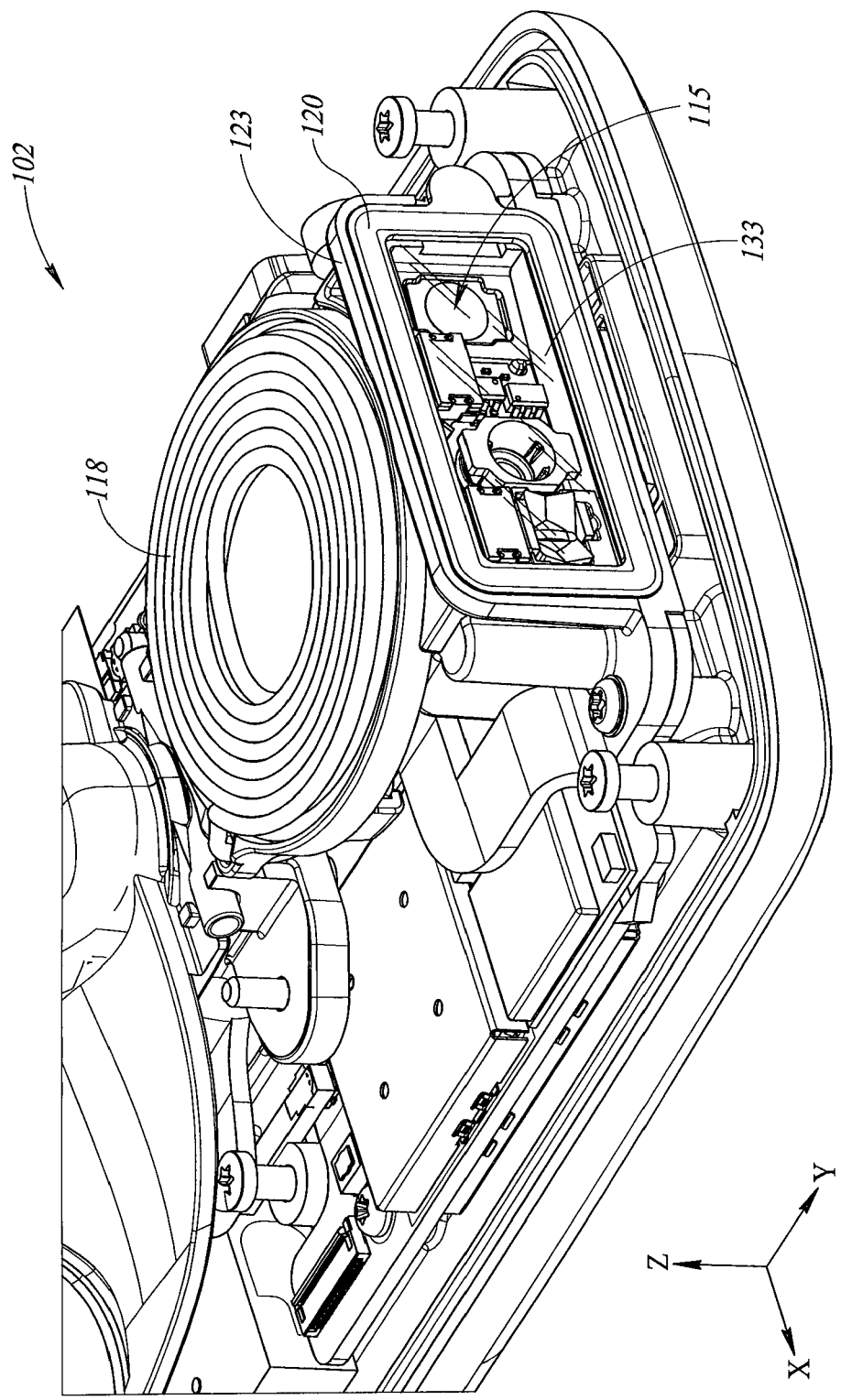
FIG. 3 is an isometric view of a portion of a mobile processor-based system showing a short-range communications coil and a wireless charging receiver coil disposed orthogonally to each other, according to one illustrated implementation.

FIG. 3 shows a portion one of the mobile systems 102 with various components removed to show the wireless charging receiver coil 118 and the short-range communications coil 120 disposed orthogonally to the wireless charging receiver coil. In FIG. 3, the wireless charging receiver coil 118 is shown as being substantially in an X-Y plane whereas the short-range communications coil 120 lies substantially in an X-Z plane which is orthogonal to the X-Y plane. The wireless charging receiver coil 118 is supported by a board 119 disposed toward a back portion of the mobile system 102. As shown, the short-range communications coil 120 is wrapped around the edges of the exit window 133 of the data reader or scan engine 115, and the short-range communications coil is adjacent, orthogonal to, and overlaying a top surface 123 of the scan engine. In some implementations, the scan engine 115 and the short-range communications coil 120 may together occupy a space of 40 mm×40 mm×16 mm (25.6 cm3), which is relatively compact. Advantageously, positioning of the short-range communications coil 120 adjacent the scan engine 115 facilitates intuitive use of the mobile system 102 since the user may direct or point the mobile system toward an object that is to be scanned or toward an object that is to be communicated with using a short-range communications protocol (e.g., NFC).

Further, by positioning the coils 118 and 120 away from a handle 141 (see handles 141A-141C in FIG. 1), any heat generated by the coils, especially the wireless charging coil 118, does not uncomfortably heat the user's palm when the user holds the mobile system just after charging has finished.

Figure 4:
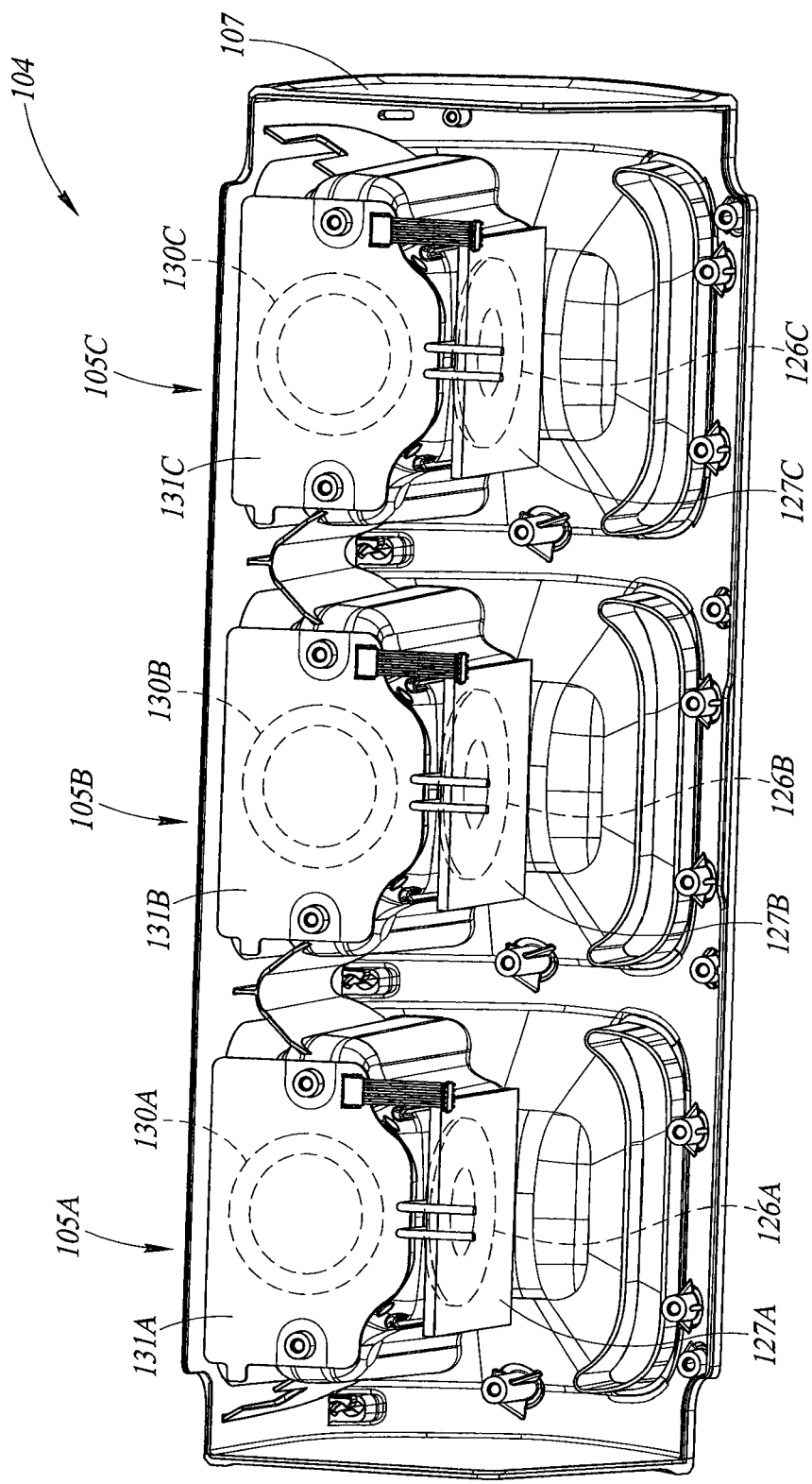
FIG. 4 is a bottom isometric view of the wireless charging cradle of FIG. 1 with a bottom cover removed to show three short-range wireless communications coils and three wireless charging coils, according to one illustrated implementation.

FIG. 4 shows a bottom view of the cradle 104 with various components removed to show circuit boards 127A-127C which support the wireless charging coils 126A-126C, and circuit boards 131A-131C which support the short-range communications coils 130A-130C. In some implementations, the short-range communications coils 130A-130C may be implemented as traces on the surfaces of the circuit boards 131A-131C, which provides a cost efficient solution.

Figure 5:
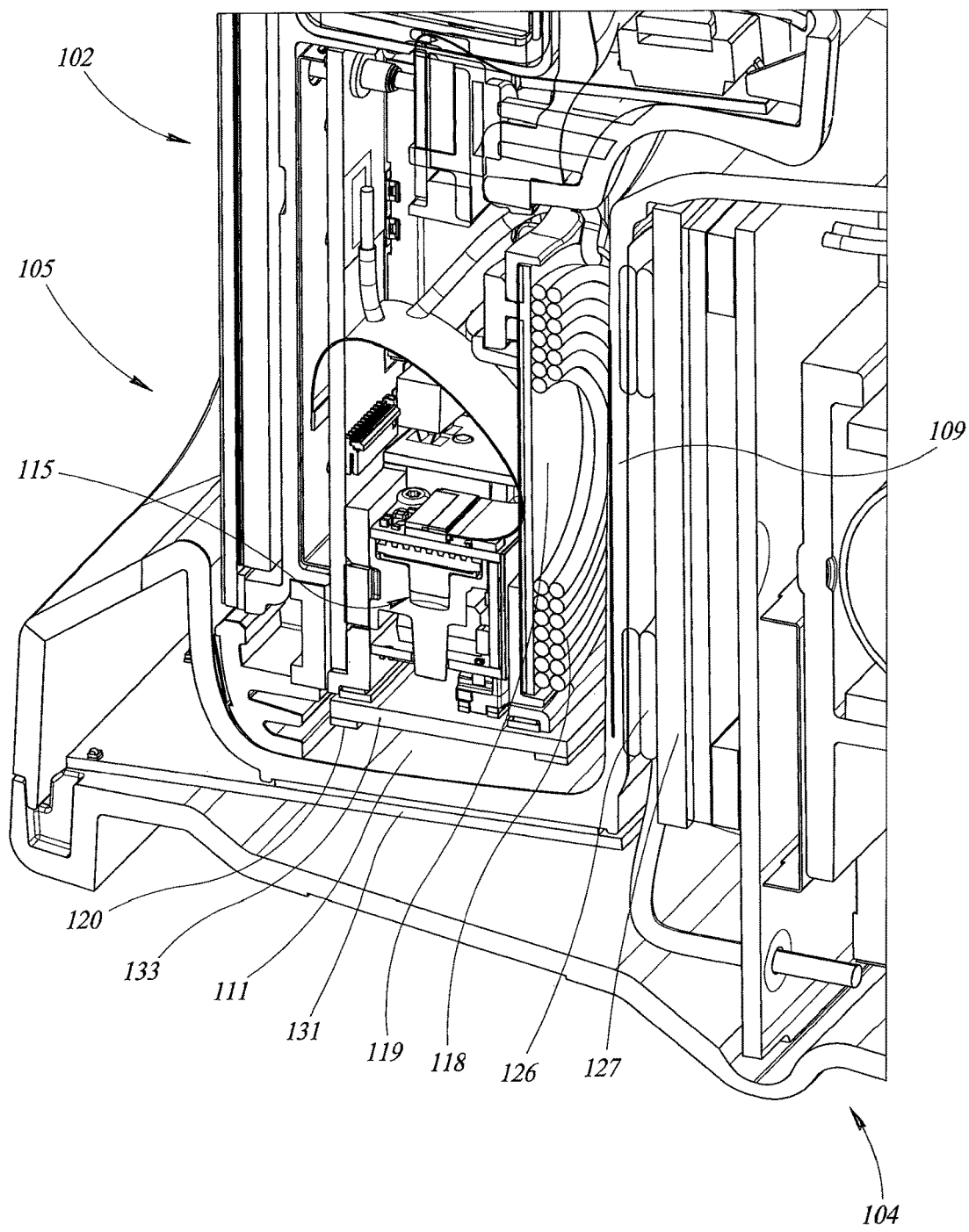
FIG. 5 is an isometric sectional view of a self-shopping system when positioned in a mobile system slot of the wireless charging cradle, according to one illustrated implementation.

FIG. 5 shows the wireless charging receiver coil 118 and the short-range communications coil 120 of the mobile system 102 when the mobile system is disposed within a slot 105 of the cradle. As shown, the short-range communications coil 120 faces downward toward the base portion 111 of the slot 105 and toward the circuit board 131 which includes the short-range communications coil 130 (FIG. 4). The wireless charging receiver coil 118 faces backward toward the back portion 109 of the slot 105 and toward the circuit board 127 which supports the wireless charging coil 126. Thus, when the mobile system 102 is disposed in the slot 105, the coils 118 and 126 are adjacent each other to facilitate wireless charging, and the coils 120 and 130 are adjacent each other to facilitate short-range wireless communication.

Figure 6:
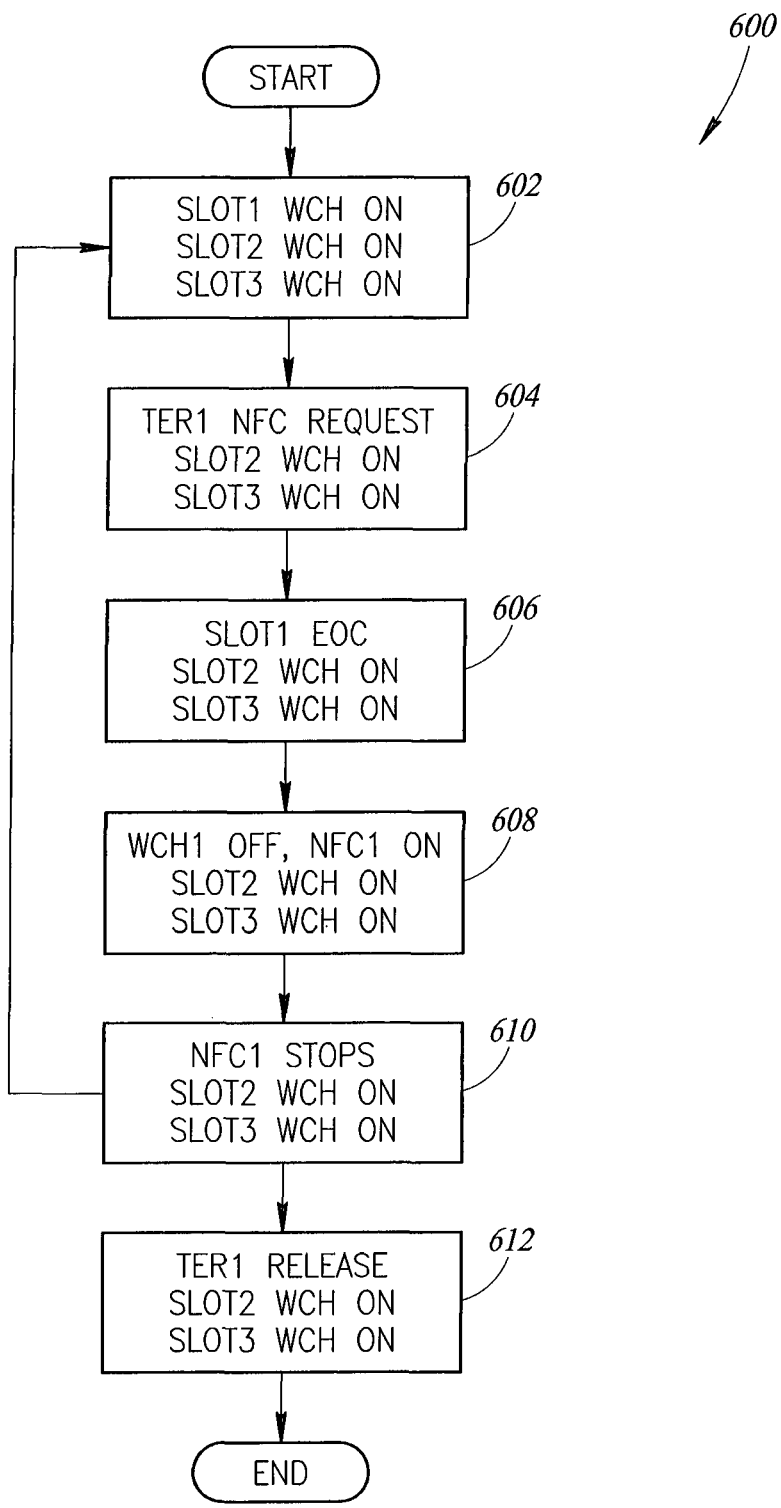
FIG. 6 is a flow diagram of a method of operating a plurality of mobile processor-based systems and a wireless charging cradle to charge the mobile processor-based systems and to provide time multiplexed communication between the mobile processor-based systems and the wireless charging cradle, according to one illustrated implementation.

FIG. 6 shows a method 600 of operating a plurality of mobile processor-based systems TER1, TER2, and TER3 and a wireless charging cradle which includes slots SLOT1, SLOT2, and SLOT3 to charge the mobile processor-based systems and to provide time multiplexed communication between the mobile processor-based systems and the wireless charging cradle, according to one illustrated implementation. The mobile processor-based systems TER1, TER2, and TER3 may be similar or identical to the mobile systems 102A-102C, and the wireless charging cradle may be similar or identical to the charging cradle 104. The method 600 may begin upon a user or users positioning three mobile systems TER1, TER2, TER3 in the slots SLOT1, SLOT2, and SLOT3, respectively, of the charging cradle for recharging of a respective chargeable power source of the mobile systems.

At 602, at least one processor of the cradle may turn on wireless charging for slots SLOT1, SLOT2, and SLOT3 to initiate charging of the mobile systems TER1, TER2, and TER3 positioned in the slots SLOT1, SLOT2, and SLOT3, respectively.

At 604, a wireless power receiver of the mobile system TER1 may send a short-range wireless communications (e.g., NFC) channel request signal to the wireless power transmitter of the slot SLOT1 over a wireless charge channel. As noted above, such signal may be in the form of a repurposed EPT0x01 charge complete signal. In such instances, rather than interpreting the received signal as a charge complete signal, the cradle interprets the received signal as a request for initiation of a short-range communications channel between the mobile system TER1 and the cradle.

At 606, the at least one processor of the cradle ceases wireless charging of the mobile system TER1 via the slot SLOT1. At 608, while wireless charging for SLOT1 is off, the NFC reader (e.g., NFC reader 128 of FIG. 2) of the cradle communicates with the mobile system TER1 via the established short-range communications channel. As discussed above, in some implementations a single NFC reader or controller may communicate with each of the mobile systems TER1-TER3 using a time multiplexer, such as the multiplexer 140 of FIG. 2. Such data may include any type of information, such as payment card information, loyalty program data, PINs, device identifiers, or data or instructions which may be used to permit a device to issue commands, requests, notifications, etc., to another device.

At 610, the at least one processor of the cradle detects that the short-range communication between the mobile system TER1 and the cradle has stopped. Responsive to detecting that the short-range communication has stopped, the at least one processor of the cradle may resume wireless charging of the mobile system TER1 at 602.

The method 600 may repeat until a user releases the mobile system TER1 from the cradle at 612. The method 600 may start again when the mobile system TER1 is returned to one of the slots of the cradle. Further, although the method 600 provides an example using the mobile system TER1, similar or identical methods are implemented for mobile systems TER2 and TER3 which are placed in slots SLOT2 and SLOT3, respectively.

Figure 7:
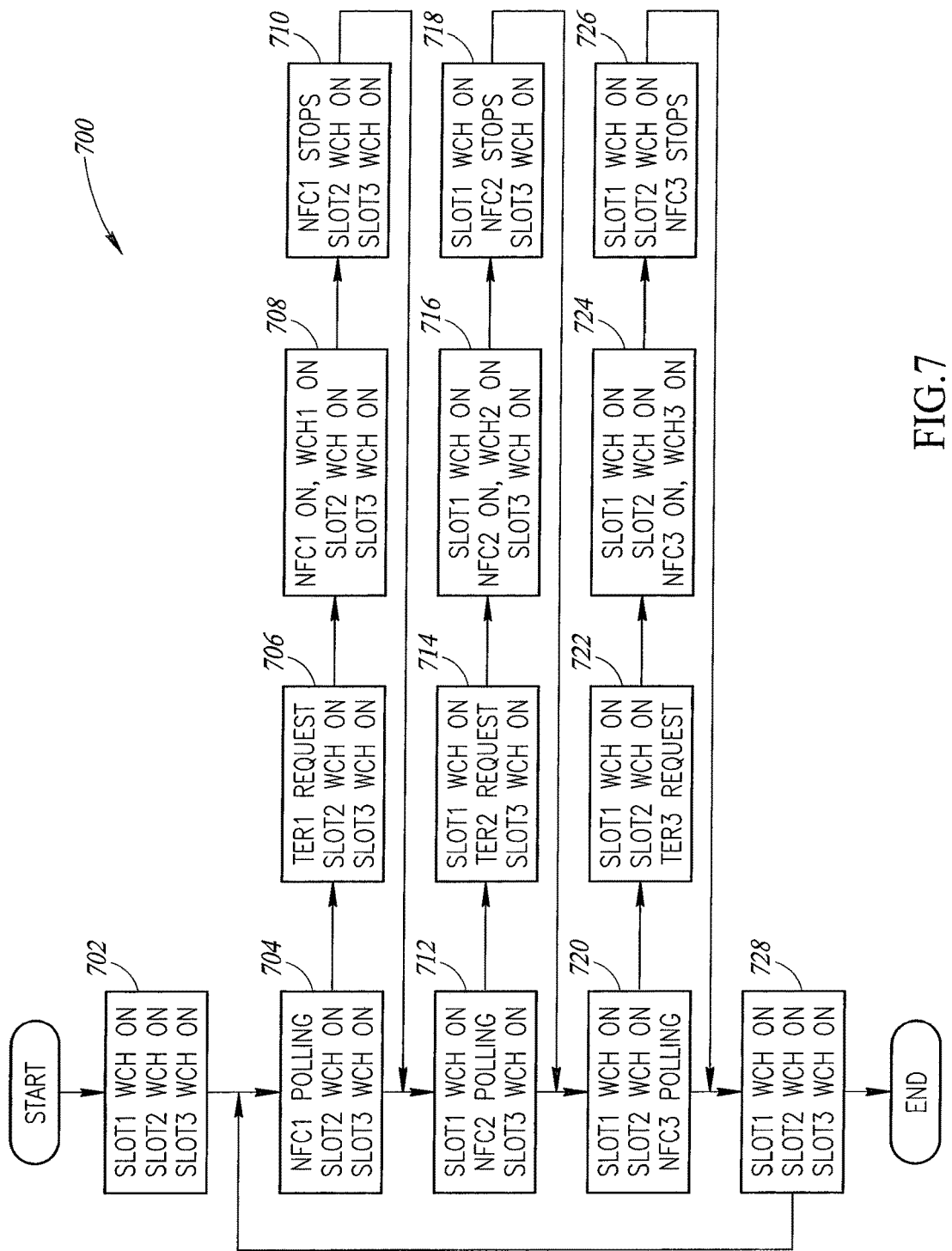
FIG. 7 is a flow diagram of a method of operating a plurality of mobile processor-based systems and a wireless charging cradle to charge the mobile processor-based systems and to provide slot multiplexed communication between the mobile processor-based systems and the wireless charging cradle, according to one illustrated implementation.

FIG. 7 shows a method 700 of operating a plurality of mobile processor-based systems TER1, TER2 and TER3 and a wireless charging cradle which includes slots SLOT1, SLOT2, and SLOT3 to charge the mobile processor-based systems and to provide slot multiplexed communication between the mobile processor-based systems and the wireless charging cradle, according to one illustrated implementation. The mobile processor-based systems TER1, TER2, and TER3 may be similar or identical to the mobile systems 102A-102C, and the wireless charging cradle may be similar or identical to the charging cradle 104. The method 700 may begin upon a user or users positioning three mobile systems TER1, TER2, TER3 in the slots SLOT1, SLOT2, and SLOT3, respectively, of the charging cradle for recharging of a respective chargeable power source of the mobile systems.

At 702, at least one processor of the cradle may turn on wireless charging for slots SLOT1, SLOT2, and SLOT3 to initiate charging of the mobile systems TER1, TER2, and TER3 positioned in the slots SLOT1, SLOT2, and SLOT3, respectively.

At 704, the at least one processor of the cradle may poll for short-range communications in SLOT1 from the mobile system TER1 placed therein. As discussed above, the at least one processor of the cradle may include a single NFC reader or controller that is coupled to three short-range communications coils through a multiplexer, which allows the single NFC reader to communicate with mobile systems TER1, TER2, and TER3 positioned in all of the slots SLOT1, SLOT2, and SLOT3.

At 706, a wireless power receiver of the mobile system TER1 may send a short-range wireless communications (e.g., NFC) channel request signal to the wireless power transmitter of the slot SLOT1 over a wireless charge channel. As noted above, such signal may be in the form of a repurposed EPT0x01 charge complete signal. In such instances, rather than interpreting the received signal as a charge complete signal, the cradle interprets the received signal as a request for initiation of a short-range communications channel between the mobile system TER1 and the cradle.

At 708, while wireless charging for SLOT1 is on, the NFC reader (e.g., NFC reader 128 of FIG. 2) of the cradle communicates with the mobile system TER1 via the established short-range communications channel. At 710, the at least one processor of the cradle detects that the short-range communication between the mobile system TER1 and the cradle has stopped.

At 712, the at least one processor of the cradle may poll for short-range communications in SLOT2 from the mobile system TER2 placed therein. At 714, a wireless power receiver of the mobile system TER2 may send a short-range wireless communications (e.g., NFC) channel request signal to the wireless power transmitter of the slot SLOT2 over a wireless charge channel. At 716, while wireless charging for SLOT2 is on, the NFC reader of the cradle communicates with the mobile system TER2 via the established short-range communications channel. At 718, the at least one processor of the cradle detects that the short-range communication between the mobile system TER2 and the cradle has stopped.

At 720, the at least one processor of the cradle may poll for short-range communications in SLOT3 from the mobile system TER3 placed therein. At 722, a wireless power receiver of the mobile system TER3 may send a short-range wireless communications (e.g., NFC) channel request signal to the wireless power transmitter of the slot SLOT3 over a wireless charge channel. At 724, while wireless charging for SLOT3 is on, the NFC reader of the cradle communicates with the mobile system TER3 via the established short-range communications channel. At 726, the at least one processor of the cradle detects that the short-range communication between the mobile system TER3 and the cradle has stopped.

After the cradle has polled each of the slots SLOT1, SLOT2, and SLOT3 for requests for short-range communication, the cradle may continue to charge each of the mobile systems TER1, TER2, and TER3 at 728. From time-to-time or continuously the cradle may poll the slots SLOT1, SLOT2, and SLOT3 for requests for short-range communication. Further, although in the method 700 the cradle provides NFC communication with a mobile system during wireless charging of the mobile system, in some implementations (see FIG. 6), the cradle may cease wireless charging for a mobile system during short-range communication with that mobile system. In some implementations, the cradle may cease wireless charging for all mobile systems during short-range communication with any one or more of the mobile systems.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A wireless charging system, comprising:
a wireless charging cradle comprising:
a plurality of mobile system slots each sized and dimensioned to removably receive at least a portion of one of a plurality of mobile processor-based systems therein;
a plurality of short-range wireless communications antenna coils, each of the short-range wireless communications antenna coils associated with one of the plurality of mobile system slots;
a plurality of wireless charging antenna coils, each of the wireless charging antenna coils associated with one of the plurality of mobile system slots, and each of the wireless charging antenna coils disposed orthogonally to the plurality short-range wireless communications antenna coils;
at least one nontransitory processor-readable storage medium which stores at least one of processor-executable instructions or data; and
at least one charging cradle processor communicably coupled to the at least one nontransitory processor-readable storage medium, the plurality of short-range wireless communications antenna coils, and the plurality of wireless charging antenna coils, wherein the at least one charging cradle processor:
selectively communicate with at least one of the plurality of mobile processor-based systems via the plurality of short-range wireless communications antenna coils; and
selectively supplies power wirelessly to at least one of the plurality of mobile processor-based systems via at least one of the plurality of wireless charging antenna coils;
wherein the wireless charging cradle further comprises:
a filtering system operatively coupled between the plurality of short-range wireless communications antenna coil and the at least one charging cradle processor, in operation the filtering system attenuates signals with frequencies at which power is supplied wirelessly via the plurality of wireless charging antenna coils.

2. The wireless charging system of claim 1 wherein the at least one charging cradle processor is configured to:
communicate with a first mobile processor-based system disposed in a first mobile system slot of the plurality of mobile system slots via the short-range wireless communications antenna coil of the first mobile system slot; and
concurrent with the communication with the first mobile processor-based system, supply power wirelessly to the first mobile processor-based system via the wireless charging antenna coil of the first mobile system slot.

3. The wireless charging system of claim 1 wherein for each mobile processor-based system disposed in one of the mobile system slots, the at least one charging cradle processor is configured to:
disable the supply of wireless power to the mobile processor-based system via the wireless charging antenna coil of the mobile system slot; and
communicate with the mobile processor-based system via the short-range wireless communications antenna coil of the mobile system slot concurrent with the supply of wireless power to the mobile processor-based system being disabled.

4. The wireless charging system of claim 1 wherein for each mobile processor-based system disposed in one of the mobile system slots, the at least one charging cradle processor is configured to:
supply power wirelessly to the mobile processor-based system via the wireless charging antenna coil of the mobile system slot;
identify an initiation of a communication with the mobile processor-based system via the short-range wireless communications antenna coil of the mobile system slot;
responsive to the identification of the initiation of the communication, cease the supply of power to the mobile processor-based system; and
subsequent to the cease of the supply of power to the mobile processor-based system, communicate with the mobile processor-based system via the short-range wireless communications antenna coil of the mobile system slot.

5. The wireless charging system of claim 4 wherein for each mobile processor-based system disposed in one of the mobile system slots, the at least one charging cradle processor is configured to:
detect an end of the communication with the mobile processor-based system via the short range wireless communications antenna coil of the mobile system slot; and
responsive to the detection of the end of the communication, resume the wireless supply of power to the mobile processor-based system via the wireless charging antenna coil of the mobile system slot.

6. The wireless charging system of claim 1 wherein the at least one charging cradle processor is configured to:
communicate with a first one of the mobile processor-based systems via the short-range wireless communications antenna coil of a first mobile system slot of the mobile system slots when the first one of the mobile processor-based systems is disposed in the first mobile system slot; and
concurrently supply power wirelessly to a second one of the mobile processor-based systems positioned in a second mobile system slot of the mobile system slots via the wireless charging antenna coil of the second mobile system slot.

7. The wireless charging system of claim 1 wherein the at least one charging cradle processor includes a single short-range wireless communications reader, the wireless charging cradle further comprising:
a multiplexer coupled between the short-range wireless communications reader and the plurality of short-range wireless communications coils, the multiplexer selectively couples one of the short-range wireless communications antenna coils to the short-range wireless communications reader to facilitate communication between the short-range wireless communications reader and a mobile processor-based system disposed in any of the plurality of mobile system slots via the short-range wireless communications antenna coils.

8. The wireless charging system of claim 1 wherein the at least one charging cradle processor is configured to:
communicate with a first mobile processor-based system disposed in a first mobile system slot of the plurality of mobile system slots via the short-range wireless communications antenna coil associated with the first mobile system slot; and concurrent with the communication with the first mobile processor-based system, supply power wirelessly to a second mobile processor-based system disposed in a second mobile system slot of the plurality of mobile system slots via the wireless charging antenna coil of the second mobile system slot.

9. The wireless charging system of claim 8 wherein the plurality of mobile system slots are aligned in a row, and the second mobile system slot is adjacent the first mobile system slot in the row of mobile system slots.

10. The wireless charging system of claim 1, further comprising:
a mobile processor-based system comprising:
a chargeable power source;
a short-range wireless communications receiver comprising a short-range wireless communications antenna coil;
a wireless power receiver including a wireless charging receiver operatively coupled to the chargeable power source which receives power wirelessly from a wireless power transmitter of the wireless charging cradle via at least one of the wireless charging antenna, the wireless charging antenna coil disposed orthogonally to the short-range communications antenna coil;
at least one nontransitory processor-readable storage medium that stores at least one of processor-executable instructions or data; and
at least one system processor communicably coupled to the at least one nontransitory processor-readable storage medium, the short-range wireless communications receiver, and the wireless power receiver, the at least one mobile system processor configured to:
receive via the wireless charging antenna coil, power wirelessly from the wireless power transmitter of the wireless charging cradle; and
communicate, via the short-range wireless communications antenna coil, at least one of instructions or data with the wireless charging cradle.

11. The wireless charging system of claim 10, wherein the mobile processor-based system further comprises a machine-readable symbol reader system, comprising:
an optical window, wherein the short-range wireless communications antenna coil is disposed adjacent the optical window of the machine-readable symbol reader system; or
an optical exit, wherein the short-range wireless communications antenna coil is disposed between the optical exit and an exterior of the mobile processor-based system.

12. The wireless charging system of claim 10, wherein the at least one system processor of the mobile processor-based system is configured to:
send, via the wireless power receiver, a short-range wireless communications channel request signal to the wireless power transmitter of the wireless charging cradle via the wireless charging antenna coil;
receive, via the short-range wireless communications receiver, an initiation signal sent from a short-range wireless communications transceiver of the wireless charging cradle responsive to receipt of the short-range wireless communications channel request signal, the initiation signal initiates a short-range wireless communications channel; and
communicate, via the short-range wireless communications receiver, at least one of instructions or data with the wireless charging cradle.

13. The wireless charging system of claim 12 wherein the short-range wireless communications channel request signal comprises an end-of-charge message.

14. The wireless charging system of claim 10 wherein the short-range wireless communications receiver comprises a near field communication (NFC) receiver or a passive NFC tag.

15. The wireless charging system of claim 10 wherein the mobile processor-based system comprises at least one of a self-shopping system, smartphone, tablet computer, wearable device, headset, speaker, mouse, keyboard, laptop, notebook, or media player.

16. The wireless charging system of claim 10, wherein the mobile processor-based system further comprises:
a filtering system operatively coupled between the short-range wireless communications antenna coil and the short-range wireless communications receiver, in operation the filtering system attenuates signals with frequencies at which power is supplied wirelessly via the wireless power transmitter of the wireless charging cradle.

17. The wireless charging system of claim 16 wherein the filtering system of the mobile processor-based system comprises a high-pass filter which passes signals with frequencies higher than a cutoff frequency and attenuates signals with frequencies lower than the cutoff frequency.

18. A wireless charging system, comprising:
a charging cradle comprising:
at least one system slot sized and dimensioned to removably receive at least a portion of a mobile processor-based system therein;
at least one short-range wireless communications antenna coil associated with the at least one mobile system slot;
at least one wireless charging antenna coil associated with the at least one mobile system slot, and disposed orthogonally to the at least one short-range wireless communications antenna coil;
at least one nontransitory processor-readable storage medium which stores at least one of processor-executable instructions or data; and
at least one charging cradle processor communicably coupled to the at least one nontransitory processor-readable storage medium, the at least one short-range wireless communications antenna coil, and the at least one wireless charging antenna coil, wherein the at least one charging cradle processor is configured to:
selectively communicate with the at least one mobile processor-based system via the at least one short-range wireless communications antenna coil; and
selectively supply power wirelessly to the at least one mobile processor-based system via the at least one wireless charging antenna coil;
wherein the charging cradle further comprises a filtering system operably coupled between the at least one short-range wireless communications antenna coil and a short-range wireless communications reader; and
wherein the filtering system is configured as a high pass filter that attenuates a carrier signal used for wireless charging and passes signals used for short-range wireless communication.

19. The wireless charging system of claim 18, wherein the at least one charging cradle processor is further configured to initiate short-range wireless communication pairing with the mobile processor-based system responsive to receiving a wireless charging end-of-charge (EOC) signal from the mobile processor-based system.

20. The wireless charging system of claim 18, wherein the carrier signal has a frequency of approximately 130 kHz.

21. The wireless charging system of claim 18, wherein the signals used for short-range wireless communication have a frequency of approximately 23.56 MHz.

22. The wireless charging system of claim 18, wherein the charging cradle includes a plurality of system slot sized and dimensioned to removably receive at least a portion of additional mobile processor-based system therein, and a multiplexer operably coupled between short-range wireless communications antenna coils associated with each system slot and a short-range wireless communications reader.

* * * * *